(12) United States Patent
Stenzel et al.

(10) Patent No.: US 9,694,901 B2
(45) Date of Patent: Jul. 4, 2017

(54) AIRCRAFT LANDING FLAP

(75) Inventors: Volkmar Stenzel, Thedinghausen (DE);
Martin Kaune, Bremen (DE);
Hubertus Lohner, Bremen (DE);
Ottmar Schramm, Drangstedt (DE)

(73) Assignee: Airbus Operations GmbH, Hamburg (DE)

( * ) Notice: Subject to any disclaimer, the term of this patent is extended or adjusted under 35 U.S.C. 154(b) by 1701 days.

(21) Appl. No.: 12/089,158

(22) PCT Filed: Sep. 27, 2006

(86) PCT No.: PCT/EP2006/066796
§ 371 (c)(1),
(2), (4) Date: Jul. 15, 2008

(87) PCT Pub. No.: WO2007/042398
PCT Pub. Date: Apr. 19, 2007

(65) Prior Publication Data
US 2009/0075058 A1    Mar. 19, 2009

(30) Foreign Application Priority Data

Oct. 7, 2005    (DE) .................. 10 2005 048 434

(51) Int. Cl.
*B64C 9/32*    (2006.01)
*B05D 5/00*    (2006.01)
(Continued)

(52) U.S. Cl.
CPC .............. *B64C 9/323* (2013.01); *B05D 5/00* (2013.01); *B64C 7/00* (2013.01); *B64C 9/02* (2013.01); *B64C 9/14* (2013.01); *B64C 9/16* (2013.01); *B64C 9/22* (2013.01); *B64C 9/32* (2013.01); *C09D 175/04* (2013.01); *C08K 3/22* (2013.01); *C08K 3/34* (2013.01); *C08L 23/04* (2013.01); *Y02T 50/44* (2013.01); *Y10T 428/25* (2015.01)

(58) Field of Classification Search
None
See application file for complete search history.

(56) References Cited

U.S. PATENT DOCUMENTS 3,986,997 A    10/1976    Clark .......................... 260/29.2
4,225,372 A *   9/1980    Kinzler et al. ................ 156/154
(Continued)

FOREIGN PATENT DOCUMENTS

DE    2556203    6/1977    ............... C09D 3/48
DE    43 04 491 A1    8/1994    ............... C09D 7/12
(Continued)

OTHER PUBLICATIONS

Russian Patent Office, Office Action in Russia dated Oct. 12, 2010, 9 pages.
(Continued)

*Primary Examiner* — Chinessa Golden
(74) *Attorney, Agent, or Firm* — Lorenz & Kopf, LLP.

(57) ABSTRACT

An aircraft landing flap includes a flap member having an abrasion-resistant coating coated on an abrasion region exposed to mechanical rubbing contacts with an aircraft spoiler. The coating comprises a polyurethane matrix based on aliphatic components and fillers embedded in the polyurethane matrix so as to increase resistance to abrasion.

12 Claims, 3 Drawing Sheets

(51) Int. Cl.
*B64C 7/00* (2006.01)
*B64C 9/02* (2006.01)
*B64C 9/14* (2006.01)
*B64C 9/16* (2006.01)
*B64C 9/22* (2006.01)
*C09D 175/04* (2006.01)
*C08K 3/22* (2006.01)
*C08K 3/34* (2006.01)
*C08L 23/04* (2006.01)

(56) References Cited

U.S. PATENT DOCUMENTS

| 4,725,026 | A | | 2/1988 | Krafka et al. | 244/219 |
|---|---|---|---|---|---|
| 5,646,228 | A | * | 7/1997 | Gras et al. | 528/45 |
| 5,845,877 | A | | 12/1998 | Justice et al. | 244/131 |
| 5,977,269 | A | | 11/1999 | Kovar et al. | 526/148 |
| 6,103,352 | A | * | 8/2000 | Takahashi | 428/195.1 |
| 6,291,078 | B1 | | 9/2001 | Chen et al. | 428/543 |
| 6,848,986 | B2 | * | 2/2005 | Kendall et al. | 451/526 |
| 2002/0137872 | A1 | | 9/2002 | Schneider et al. | 528/44 |
| 2005/0112285 | A1 | * | 5/2005 | Keener et al. | 427/372.2 |
| 2005/0203202 | A1 | * | 9/2005 | Weine Ramsey | 522/71 |

FOREIGN PATENT DOCUMENTS

| DE | 195 29 987 A1 | 2/1997 | B05D 1/36 |
|---|---|---|---|
| GB | 2 323576 A | 9/1998 | B64C 9/00 |
| SU | 513065 | 5/1976 | C09D 3/72 |
| SU | 621319 | 8/1978 | C08L 83/04 |

OTHER PUBLICATIONS

International Search Report (PCT/EP2006/066796) dated Jan. 29, 2007.

* cited by examiner

AIRCRAFT LANDING FLAP

The present invention primarily relates to the use of certain filler-containing polyurethane lacquers as an abrasion-resistant coating, in particular for the visible abrasion region of aircraft components mechanically rubbing on one another during operation. Special attention is paid here to the region of the aircraft landing flaps in the contact region with the spoilers.

Figure 1:
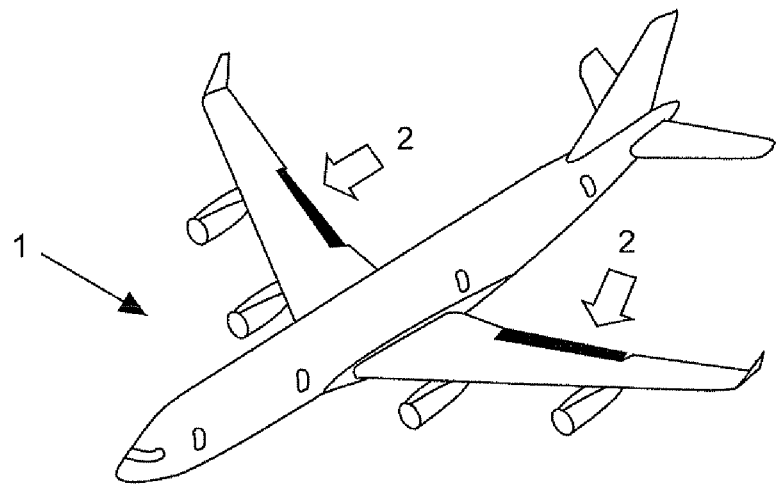

Modern aircrafts have landing flaps with associated spoilers which, viewed in the direction of flying, are located in the rear region of the wings, cf. FIG. 1. During the take-off and landing process, the landing flaps are retracted or extended for adjusting certain aerodynamic properties. In the process, the spoiler rubs or abrades a region of the landing flap, so this has to be protected from damage, cf. FIG. 2.

Currently, regions of the landing flaps at risk of abrasion in aircraft construction are protected by applying thin steel sheets, so-called abrasion protection strips or abrasion protection metal sheets. The abrasion protection strips (abrasion protection metal sheets) are applied in a laborious manner according to the following sequence:

After partial masking of the landing flap (in the region outside the abrasion protection metal sheet), the region of the landing flap to be protected is cleaned with solvent-containing cleaner. Abrasion protection metal sheets are then applied by means of a sealing compound (adhesive) to the landing flap. The sealing compound is then cured under vacuum for a relatively long period (at least 12 hours). After curing, there follows an aftertreatment, which in particular comprises cleaning and unmasking steps. Only then is the landing flap lacquered, for which purpose the region of the abrasion protection metal sheets has to be masked and then unmasked.

The use of abrasion protection strips in the region of the landing flaps is connected, in particular, with the following disadvantages:

- The use of abrasion protection metal sheets generally with a small thickness leads to frequent bending or scratching before and during joining and therefore to a high reject proportion.
- The finishing steps of cleaning the region of the landing flap to be protected and joining the abrasion protection metal sheets require a highly precise procedure. Even small deviations from the specifications led to errors in the adhesion of the abrasion resistant metal sheet to the landing flap or to non-adherence to requirements of the visual design.
- Solvent-containing (VOC-containing) cleaning agents are used for cleaning the landing flap and the abrasion protection strips prior to joining as the necessary surface quality can only be achieved in this manner. The use of solvent-containing cleaning agents is, however, increasingly regarded as undesirable.
- The cleaning and joining processes are very time-consuming.
- Local repair of damaged abrasion protection metal sheets is not possible. Each repair of a damaged abrasion protection metal sheet is connected with its removal from the landing flap and renewed cleaning and joining steps.

It was therefore the object of the present invention to ameliorate or eliminate at least some of the aforementioned disadvantages, which are connected with the use of abrasion protection metal sheets (abrasion protection strips).

According to a first aspect, the object posed is achieved according to the invention by the use of a lacquer comprising
- a polyurethane matrix based on aliphatic components and
- fillers which are embedded in the polyurethane matrix and increase the resistance to abrasion as an abrasion-resistant coating of (a) aircraft landing flaps in the contact region with the spoilers.

It has surprisingly been shown that polyurethane lacquers which comprise fillers which increase the abrasion resistance, are suitable to be used instead of the previously used abrasion protection metal sheets.

The lacquers used comprise a polyurethane matrix based on aliphatic components which at most exhibit slight (not visible to the eye) discolorations on thermal loading (temperature range −55 to 100° C.). Embedded in the polyurethane matrix are the fillers increasing the abrasion resistance.

The lacquer system is applied in the still uncured state, for example on the external primer or on the external top coat of a landing flap by means of spraying or another suitable method to cure there. The dry layer thickness is regularly in the range between 10 μm and 300 μm. In order to achieve layer thicknesses >50 μm, the described application process is optionally repeated several times until the desired layer thickness is reached.

Lacquers comprising a polyurethane matrix based on aliphatic components and fillers embedded in the polyurethane matrix and increasing the resistance to abrasion are not only suitable as an abrasion-resistant coating of (a) aircraft landing flaps in the contact region with the spoilers. A further possible area of use is, for example, (b) the abrasion region of the cargo doors, but said lacquers may also be advantageously used (c) in the abrasion regions of other aircraft components mechanically rubbing on one another during operation. Corresponding uses are a further subject of the present invention.

A further aspect of the present invention relates to an aircraft landing flap with an abrasion-resistant coating in the contact region with the spoilers, wherein the coating consists of a cured lacquer, comprising or consisting of:
- a polyurethane matrix based on aliphatic components and
- fillers which are embedded in the polyurethane matrix and increase the resistance to abrasion.

Furthermore, the present invention relates to new abrasion-resistant lacquers, which are suitable, in particular, for coating aircraft landing flaps in the contact region with the spoilers.

Surprisingly, it has been shown in protracted internal investigations that the lacquers to be used according to the invention (lacquer systems) satisfy all the requirements in connection with the abrasion protection of the landing flaps, specifically in particular from the mechanical and visual aspect. Amongst the diverse requirements, the following are, in particular, highly relevant:
- adhesion to the substrate
- abrasion resistance
- chemical resistance (in particular good resistance to water and hydraulic fluid (Skydrol))
- resistance to yellowing (thermal and UV colour fastness). High UV-resistance could be achieved in own investigations only with the use of a polyurethane matrix based on aliphatic components; the use of aromatic components led to UV-unstable lacquers.

The following advantages were moreover produced:
- when using the disclosed lacquers according to the invention as fire protection lacquers (abrasion-resistant coating) in particular on aircraft landing flaps in the contact region with the spoilers, the lacquer can be applied advantageously by means of a spray process. This manner of proceeding is considerably more advantageous and less disruptive from the point of view of time and cost than the previously used methods for applying abrasion protection metal sheets. The manufacturing process can be automated.

when using lacquers according to the invention based on polyurethane, the high reject proportion connected with the use of abrasion protection metal sheets is dispensed with.

in comparison to the use of abrasion protection metal sheets, a masking and unmasking step is dispensed with.

damaged abrasion-resistant coatings produced with the use according to the invention of a polyurethane lacquer system can be repaired locally after rubbing down the coating surface.

prior to application of the abrasion-resistant coatings with use according to the invention of a lacquer based on polyurethane, the components (in particular landing flaps) can be cleaned with cleaners which comprise comparatively small quantities of organic solvents.

the use according to the invention of lacquers based on polyurethane with their embedded fillers increasing the abrasion resistance led to good frictional properties with friction partners made of steel, CFRP and titanium at temperatures in the range between −55° C.+60° C.

in comparison to the use of abrasion protection metal sheets, a significant weight saving results (about 10 kg in use on the aircraft of the Airbus model A 340).

Even if a large number of different fillers can be embedded in the polyurethane matrix to increase the abrasion resistance of the corresponding lacquer, certain fillers are strongly preferred. Thus, it is particularly advantageous, for example, to select fillers from the group consisting of:
fillers with a Mohs hardness of at least 7 and a particle size of 0.1 $\mu m<d_{50}<30$ $\mu m$, preferably 2 $\mu m<d_{50}<15$ $\mu m$,
fillers with a Mohs hardness of at most 2 and a particle size of 3 $\mu m<d_{50}<50$ $\mu m$ and mixtures thereof.

Fillers with a Mohs hardness of at least 7 are also called "hard" fillers below and fillers with a Mohs hardness of at most 2 are also called "soft" fillers below.

Surprisingly, it has been shown that both the use of hard and the use of soft fillers leads to the abrasion resistance of a polyurethane lacquer, which is to be used as abrasion protection on landing flaps relative to spoilers, being significantly increased if the particle size ranges disclosed here are adhered to. The simultaneous use of hard and soft fillers in the polyurethane matrix is particularly advantageous.

The hard fillers are preferably ceramic fillers; the soft fillers are preferably plastics material fillers.

Materials are advantageously used as fillers which themselves have no particular or no obtrusive intrinsic colouring, in other words white materials. The use of coloured or even black fillers is possible, however, if the fillers used only influence the colour shade of the finished lacquer decisively at high loading quantities, i.e. impart colour. In our investigations it has been shown that graphite (as a black, soft filler material) regularly negatively influences the colour shade of a lacquer to be used according to the invention; preferred lacquers to be used according to the invention are therefore graphite-free.

The ceramic fillers are preferably selected from the group consisting of:
silicon carbide, silicon dioxide, aluminium oxide, zirconium oxide, spinel, boron nitride and mixtures thereof.

The soft fillers preferably consist of ultra high molecular polyethylene such as, for example GUR 2126 from Ticona.

Mixtures of hard and soft fillers (with the particle sizes given above in each case) are preferably used in the lacquers to be used according to the invention, the weight ratio of the fillers being in the range of 1:9 to 9:1. Particularly good results were achieved in our own investigations when using mixtures of hard and soft fillers.

The concentration of the hard or soft fillers in the lacquers to be used according to the invention is also important for the abrasion protection. The proportion of hard fillers with a particle size in the range given above is preferably in the range of 5 to 35% by weight, preferably in the range of 7 to 15% by weight and/or the proportion of soft fillers with a particle size in the range given above is in the range of 5 to 35%, preferably in the range of 7 to 15% by weight, in each case based on the total mass of the lacquer.

As mentioned, the present invention also relates to an aircraft landing flap with an abrasion-resistant coating in the contact region with the spoilers, wherein the coating consists of a cured lacquer, comprising or consisting of a polyurethane matrix based on aliphatic components and fillers embedded in the polyurethane matrix and increasing the resistance to abrasion.

The coating of the aircraft landing flap in this case preferably consists of a lacquer such as disclosed as preferred above.

The present invention also relates to certain abrasion-resistant lacquers, which are suitable, in particular, for coating aircraft landing flaps in the contact region with the spoilers, but can obviously also be used for other purposes. An abrasion-resistant lacquer according to the invention comprises
  a polyurethane matrix based on aliphatic components and
  fillers which are embedded in the polyurethane matrix and increase the resistance to abrasion,
wherein the fillers are selected from the group consisting of:
  fillers with a Mohs hardness of at least 7 and a particle size of 0.01 $\mu m<d_{50}<30$ $\mu m$
and
mixtures of such fillers with fillers with a Mohs hardness of at most 2 and a particle size of 3 $\mu m<d_{50}<50$ $\mu m$.

In this case, that which was stated above applies accordingly with regard to the selection of filler materials, weight ratios (with a filler mixture) and concentrations.

The lacquers according to the invention and to be used according to the invention also regularly comprise, apart from the disclosed components (a) polyurethane matrix and (b) selected fillers, further components, in particular additives (surface additives, wetting additives, defoaming agents), pigments (colouring constituents; inasmuch as certain pigments in the individual case can be regarded as "fillers" of the above-mentioned type, in the context of the present text, these are not further constituents of the lacquer, but "fillers") as well as optionally further constituents.

Figure 2:
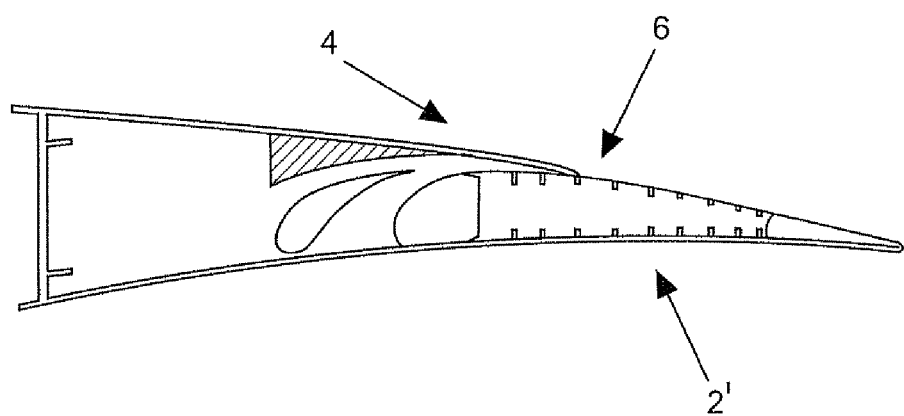
Figure 3:
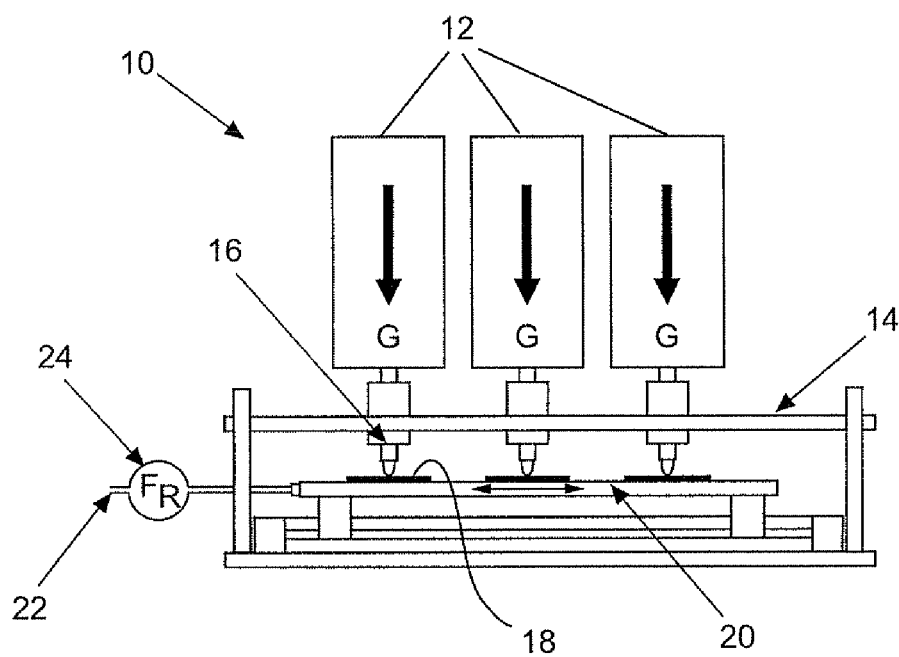
Figure 4A:
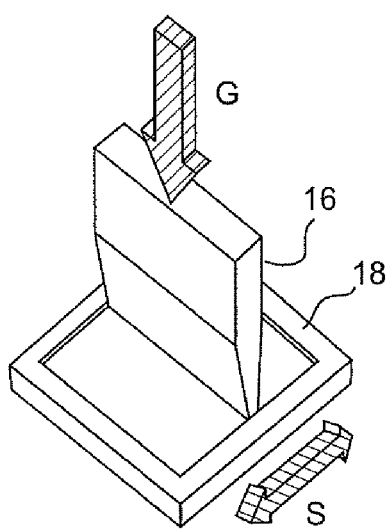
Figure 4B:
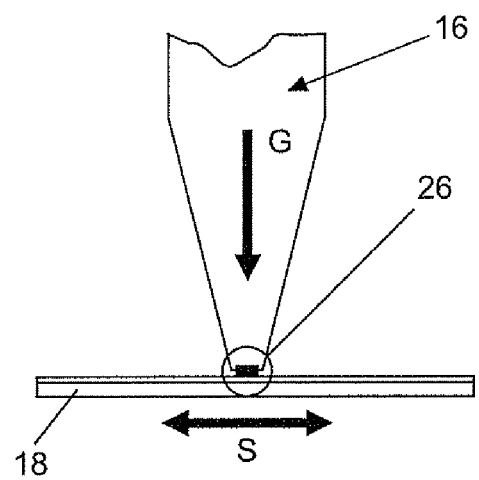
Figure 5:
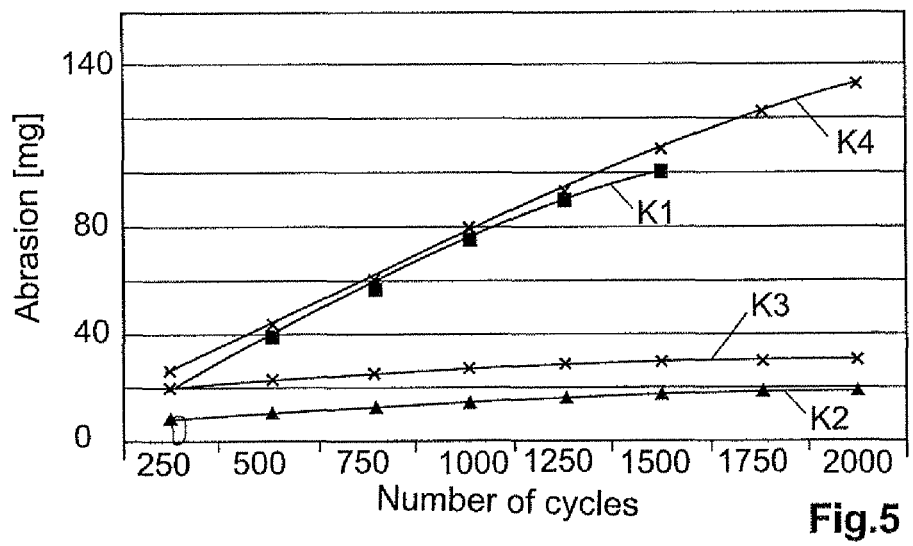
Figure 6:
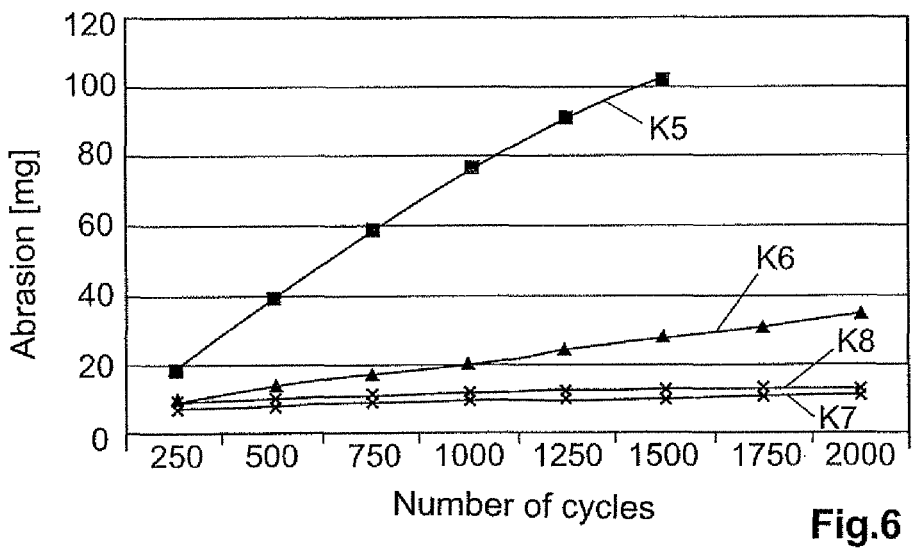
Figure 7:
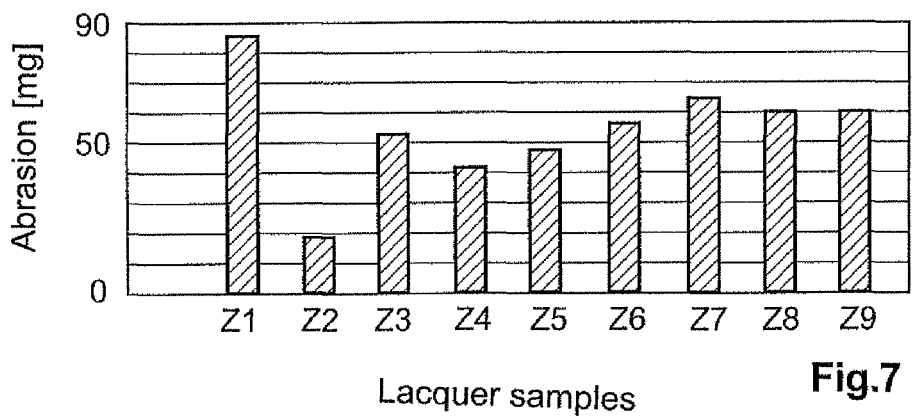

The invention will be described in more detail below with the aid of examples with reference to the following figures, in which:

FIG. 1 shows an aircraft with landing flaps for the application of abrasion protection coatings, FIG. 2 shows a sectional view through the wing part with a landing flap to apply abrasion protection coatings, FIG. 3 shows an abrasion test stand for investigating the abrasion resistance of lacquers, FIG. 4*a* shows a schematic view of the kinematics and testing geometry used as a basis for the abrasion test stand according to FIG. 3, in a perspective view, FIG. 4b shows a cut-out of FIG. 4a in a side view, FIG. 5 shows a graph on the influence of the particle size of hard fillers on the abrasion behaviour, FIG. 6 shows a graph on the influence of the particle size of soft fillers on the abrasion behaviour and FIG. 7 shows a graph on the influence of the filler concentration on the abrasion resistance.

The aircraft 1 according to FIG. 1 has, on its wings, landing flaps 2 which are retracted and extended during the take-off and landing process.

FIG. 2 shows in a sectional view that the landing flap 2' is arranged below a spoiler 4. If the spoiler 4, as shown in FIG. 2, is not folded up, the spoiler 4 and the landing flap 2' are in contact with one another in a friction region 6. If the landing flap 2' is extended, for example, for landing, the spoiler 4 in this friction region 6 rubs on the landing flap 2' which means a friction loading for the landing flap 2' in this friction region 6.

Example 1: Abrasion Test According to Pren 6124

Abrasion tests according to PrEN 6124 were carried out on a special friction test stand to simulate as precisely as possible the abrasion behaviour such as will occur during operation on the aircraft landing flap.

Lacquers to be checked are applied for this purpose to a sample metal sheet (aluminium), and then held with the latter on a sample table of a friction test stand.

The lacquered sample metal sheets correspond to the protection-lacquered regions of a landing flap. A friction test stand 10 according to PrEN 6124 is shown in FIG. 3. The friction test stand 10 has three loading containers 12 filled with tungsten powder, each having a weight of G=566 N. The loading containers 12 are held in a linear bearing-guided, height-adjustable and lockable first sample holder 14. The weight of the loading containers 12 in each case weighs down on a linear bearing-guided second sample holder 16. The second sample holder 16 holds a friction partner corresponding to a spoiler flap, which as a counter-member weighs down on a sample metal sheet 18 in each case. The sample metal sheets 18 are arranged on a linearly guided sample table 20, which is brought by a hydraulic drive 22 to a horizontal movement a speed v=35 mm/s with a friction path s=80 mm. An SPS control of the stress reversals takes place. Measurement of the frictional force, from which the coefficient of friction μ is determined, takes place by means of the load cell 24.

The conditioning of the sample metal sheets takes place as follows:

The lacquers to be tested are applied to aluminium plates and stored for 7 days at room temperature. Abrasion tests are then carried out on the abrasion test stand according to PrEN 6124.

A friction path of 80 mm was run through in each case on the friction test stand according to PrEN 6124. The loaded weight was 566 N per cylinder, i.e. per sample metal sheet. The speed of the linearly guided sample table was 35 mm/s.

Samples manufactured from the usual materials for spoiler edges (for example CFRP, titanium, steel 1.4548, polyamide, CuBe and silicon rubber) were clamped in the sample holders. The dimensions of the clamped-in samples were in each case 2×80 mm.

A maximum load of 3.54 N/mm² acted on each case on the lacquers to be tested.

Further details regarding the kinematics and test geometry, on the one hand, and with regard to the sample arrangement, on the other hand, emerge from FIGS. 4a and 4b.

FIG. 4a shows a perspective view of the basic sample arrangement. The weight G weighs down on the second sample holder 16 and therefore presses the sample holder 16 with the sample contained onto the sample sheet metal 18. The sample sheet metal is moved in an oscillating manner along the friction path s, which is 80 mm, at a speed of v=35 mm/sec. In this case, there is a sample loading of F=3.54 N/mm².

It can be seen from the side view according to FIG. 4b that the sample 26 is accommodated in the second sample holder 16 and the weight G presses on the sample plate 18. The sample 26 which represents the spoiler flap, has a contact surface toward the sample surface 18 of 2×80 mm. In this case, the sample 26 is glued in a groove of 0.5 mm in depth.

To compare different lacquers with regard to their abrasion resistance by means of the test stand according to PrEN 6124, differently lacquered sample metal sheets were investigated accordingly and the abrasion determined after a maximum of 2,000 cycles; a weight control of the respective sample took place every 250 cycles.

To compare corresponding counter-bodies (spoiler samples) different spoiler materials were subjected to a loading of a maximum of 2,000 cycles; a weight control of the counter-bodies took place, in this case, every 250 cycles.

In the case of spoiler samples made of steel, titanium and CFRP (carbon fibre-reinforced plastics material), a coefficient of friction μ<0.6 was achieved.

The test temperatures adjusted were: 23° C., −55° C. and 60° C.

The test media used were: Skydrol and standard dirt.

It was necessary inter alia for the abrasion wear tests to also carry them out at temperatures of 60° C. and −55° C. This was to ensure that the wear protection layer is also effective in use areas with a high heating action (aircraft location in hot areas of the Earth). The same applies to extreme cold, such as occurs at or prior to approaches to landing.

Corresponding investigations were carried out by means of the taking of a sample designed for this purpose, which was rinsed with cooling or heating liquid.

Our own investigations according to PrEN 6124 led to the result that by embedding above-described fillers increasing the abrasion resistance in a polyurethane matrix, a very high abrasion resistance can be achieved satisfying the high requirements in the aircraft industry. The use of fillers which are characterised above as preferred has proven to be particularly advantageous.

It should be mentioned in this context that not only lacquers based on polyurethane with integrated fillers have a wear resistance meeting high requirements but also certain epoxy lacquers, such as, for example, the commercial product Ceram Kote 54 also certainly proved thoroughly suitable to this extent; however the lacquers not to be used according to the invention failed in other tests which were carried out to take into account the requirements in the aircraft industry with regard to abrasion protection systems suitable in practice, cf. the following examples.

Example 2: Temperature Test/Thermal Yellowing Test

Lacquer systems to be tested were lacquered onto aluminium plates of the type 2024 T3 conventional in aircraft construction and stored for 7 days at room temperature. The respective colour shades were then measured with a colorimeter as a standard. The samples were then stored immediately afterwards at 110° C. or 150° C., that is at temperatures such as can occur in hot climates on aircraft surfaces. After a hundred hours of storage at an elevated temperature, the colour shade deviation was determined by comparison with the standard (starting value).

The colour space in colour shade measurement is composed of the values Da (red/green axis), Db (blue/yellow axis) and DL (light/dark axis). As a value composed of the three aforementioned values, DE describes in a colour shade comparison, how comparable two colour shades are. In this case, the Db value and the DE value are a criterion of the colour shade change owing to UV light or thermal stress. A displacement on the blue/yellow axis, i.e. a yellowing, is reflected in the comparative measurement both in the Db value and also in the DE value.

The lacquers to be used according to the invention based on polyurethane only have a very slight colour shade deviation in each case.

In contrast to this, when using the epoxy system Ceram Kote 54 a very marked colour shade deviation was produced corresponding to a very strong yellowing and accompanied by a mechanically unacceptable embrittlement.

Example 3: Cross-cut Test to DIN EN ISO 2409

By means of a cross-cut test to DIN EN ISO 2409, the adhesiveness of certain lacquers was investigated.

The lacquers to be used according to the invention were distinguished here by particularly good properties.

Example 4: Influence of Filler Material and Particle Size on the Abrasion Properties 4.1 Hard Fillers:

Proceeding from an aircraft covering lacquer system based on polyurethane (based on aliphatic components) lacquers with highly abrasion-resistant, hard fillers of different particle-sizes and types of material were produced.

The three different lacquers to be used according to the invention were investigated, for the fillers of which (FS 1, FS 2, FS 3) the following applied:

FS 1: silicon carbide (Mohs hardness: 9.6); particle size: $d_{50}=1.5$ µm; colour: black, but only colour-imparting at very high addition quantities.
 Note: analogous investigations were also carried out with other particle sizes and colours.

FS 2: Aluminium oxide $Al_2O_3$ (Mohs hardness: 9); particle size: $d_{50}=28$ µm; colour: white/grey.
 Note: analogous investigations were also carried out with other particle sizes.

FS 3: Pyrogenic silica ($SiO_2$ nano particles); (Mohs hardness: 7); particle size $d_{50}=12$ nm; colour: white.
 Note: analogous investigations were also carried out with other particle sizes.

The concentration of the fillers FS 1, FS 2 and FS 3 in the polyurethane aircraft covering lacquer used as the matrix were adjusted to 10% by weight, in each case, based on the total mass of the lacquer.

Titanium was used in the investigations as the counter-member; the abrasion test was carried out with a test stand according to PrEN 6124, cf. Example 1.

The influence of the particle size (and the filler material) emerges from FIG. 5. The number of cycles is plotted on the abscissa and reaches 2,000, the abrasion quantity is entered on the ordinate in mg and reaches 140 mg. The following coatings were investigated:

K1: standard polyurethane aircraft covering lacquer system;
K2: standard polyurethane aircraft covering lacquer system with 10% of the filler FS 1 ($d_{50}=1.5$ µm);
K3: standard polyurethane aircraft covering lacquer system with 10% of the filler FS 2 ($d_{50}$ about 28 µm);
K4: standard polyurethane aircraft covering lacquer system with 10% of the filler FS 3 ($d_{50}=12$ nm).

It is seen that all the polyurethane lacquers provided with fillers had improved abrasion properties compared to the standard polyurethane aircraft covering lacquer system or were at least equivalent. The most convincing was the performance of the K2 system using 10% of the filler FS 1, which is presumably primarily due to the selected particle size.

Further investigations have shown that particularly small and particularly large particle sizes (within the interval to be adhered to according to the invention) frequently led to poorer results when using hard fillers than particles sizes in a medium range of 1.5 to 15 µm.

4.2 Soft Fillers:

Proceeding from an aircraft covering lacquer system based on polyurethane (based on aliphatic components), lacquers with highly abrasion-resistant, soft fillers of various particles sizes and types of material were produced.

FS 4: Ultra high molecular polyethylene polymer GUR 2126 from Ticona: particle size $d_{50}$ in the range from about 25 to 30 µm according to our investigations, no $d_{50}$ information from the producer; colour: white-cream; form: solid powder; density: 0.93 g·cm³, bulk density: (DIN 53466) at least 0.4 kg/m³; Mohs hardness about 2 to 2.5; melting temperature: DSC, 10 K/min (ISO 3146 Method C): 130 to 135° C. (powder).

The concentration of the filler FS 4 in the polyurethane aircraft covering lacquer used as a matrix was adjusted to 5, 10 or 15%, based on the total mass of the lacquer.

Titanium was used as the counter-member in the investigations, the abrasion test was carried out with a test stand according to PrEN 6124, cf. Example 1.

The influence of the particle size emerges from FIG. 6. The number of cycles is again entered on the abscissa and reaches 2,000 and the abrasion quantity is again entered on the ordinate in mg. The following coatings were investigated:

K5: standard polyurethane aircraft covering lacquer system;
K6: standard polyurethane aircraft covering lacquer system with 5% of the filler FS 4
K7: standard polyurethane aircraft covering lacquer system with 10% of the filler FS 4
K8: standard polyurethane aircraft covering lacquer system with 15% of the filler FS 4.

It can be seen that improved abrasion properties were achieved with all the concentrations of the filler FS 4. Upon changing from 10% of the filler FS 4 to 15% of the filler FS 4 (change from K7 to K8) no further improvement could be established.

In the additional investigations, the coefficients of frictions µ were determined as a function of the number of cycles for the aircraft covering lacquer system K7. Even after 2,000 cycles, the coefficient of friction µ was no higher than 0.33. Compared with this, the coefficient of friction µ for the standard polyurethane aircraft covering lacquer system K5 (without addition of a filler) was already clearly above 0.4 after only 500 cycles.

Example 5: Influence of the Filler Concentration on the Abrasion Resistance

The concentration of the hard fillers in the polyurethane lacquer matrix also influences the abrasion resistance of a finished lacquer.

The abrasion quantities are shown in mg in FIG. 7 in abrasion tests with a Taber® Abraser 1,000 U, 1,000 g, Rolle CS 17 with different filler quantities, in a graph. The following fillers and filler quantities were added to standard polyurethane aircraft covering lacquer systems as filler quantities:

Z1 no filler addition;
Z2 10% inorganic filler FS 1 ($d_{50}$=1.5 μm);
Z3 20% inorganic filler FS 1 ($d_{50}$=1.5 μm);
Z4 30% inorganic filler FS 1 ($d_{50}$=1.5 μm);
Z5 10% inorganic filler FS 2 ($d_{50}$=28 μm);
Z6 20% inorganic filler FS 2 ($d_{50}$=28 μm);
Z7 30% inorganic filler FS 2 ($d_{50}$=28 μm);
Z8 10% inorganic filler FS 3 ($d_{50}$=12 nm);
Z9 20% inorganic filler FS 3 ($d_{50}$=12 nm).

It emerges from FIG. 7 that when using the fillers FS 1 or FS 2, a respective concentration of 10% by weight filler in the polyurethane matrix, a better abrasion resistance resulted than with corresponding lacquers with proportions of 20 or 30% by weight filler. Overall, the concentration range of 7 to 15% by weight proved to be particularly advantageous in a large number of investigations.

The invention claimed is:

1. A method for treating an aircraft landing flap comprising a flap member having an abrasion region in an area configured for exposure to mechanical rubbing contacts with an aircraft spoiler, the method comprising:
    applying an abrasion-resistant coating to the abrasion region of the flap member arranged so that the mechanical rubbing contacts by the aircraft spoiler are made against the coating, wherein the abrasion-resistant coating comprises:
        a polyurethane matrix based on aliphatic components, and
        fillers embedded in the polyurethane matrix so as to increase resistance to abrasion, wherein the increase in resistance to abrasion measured after abrasion corresponding to 1500 of the mechanical rubbing contacts produces at least 30% less loss of the abrasion resistant coating relative to a coating of the polyurethane matrix without the embedded fillers, and
        the fillers further comprise a first filler having a Mohs hardness of at most 2 and a particle size of 3 μm<d50<50 μm, and a second filler having a Mohs hardness of at least 7 and a particle size of 0.1 μm<d50<30 μm.

2. The method according to claim 1, wherein the second filler includes ceramic fillers.

3. The method according to claim 2, wherein the ceramic fillers are selected from the group consisting of silicon carbide, silicon dioxide, aluminum oxide, zirconium oxide, spinel, and mixtures thereof.

4. The method according to claim 1, wherein the first filler includes plastic fillers.

5. An aircraft landing flap comprising:
    a flap member having an abrasion region in an area configured for exposure to mechanical rubbing contacts with an aircraft spoiler; and
    an abrasion-resistant coating on the abrasion region of the flap member arranged so that the mechanical rubbing contacts by the aircraft spoiler are made against the coating, wherein the abrasion-resistant coating comprises:
        a) a polyurethane matrix based on aliphatic components,
        b) fillers embedded in the polyurethane matrix so as to increase resistance to abrasion, wherein the increase in resistance to abrasion measured after abrasion corresponding to 1500 of the mechanical rubbing contacts produces at least 30% less loss of the abrasion resistant coating relative to a coating of the polyurethane matrix without the embedded fillers, and
        the fillers further comprise a first filler having a Mohs hardness of at most 2 and a particle size of 3 μm<d50<50 μm, and a second filler having a Mohs hardness of at least 7 and a particle size of 0.1 μm<d50<30 μm.

6. The aircraft landing flap according to claim 5, wherein the second filler accounts for 7 to 15% the total weight of the abrasion-resistant coating.

7. The aircraft landing flap according to claim 5, wherein the fillers accounts for 7 to 15% the total weight of the abrasion-resistant coating.

8. The aircraft landing flap according to claim 5 wherein the fillers are selected from a group consisting of silicon carbide, silicon dioxide, aluminum oxide, zirconium oxide, spinel, boron nitride, and mixtures thereof.

9. The aircraft landing flap according to claim 5, wherein the first filler comprises ultra high molecular polyethylene.

10. The aircraft landing flap according to claim 5, wherein abrasion is determined according to test PrEN6124.

11. The aircraft landing flap according to claim 10, wherein the test PrEN6124 is performed at a temperature of −55° C. and 60° C.

12. The aircraft landing flap according to claim 5, wherein the flap member has a first end and a second end, and the abrasion-resistant coating on the abrasion region extends over only a portion of the flap member between the first end and the second end.

* * * * *